United States Patent
LaCroix et al.

(10) Patent No.: US 11,591,538 B2
(45) Date of Patent: *Feb. 28, 2023

(54) COOLING AND FLAME-RETARDANT LUBRICATING COMPOSITION FOR A PROPULSION SYSTEM OF AN ELECTRIC OR HYBRID VEHICLE

(71) Applicant: TOTAL MARKETING SERVICES, Puteaux (FR)

(72) Inventors: Eric LaCroix, Amberieux d'Azergues (FR); Philippe China, Seyssuel (FR); Francis Rondelez, Fontenay-Aux-Roses (FR)

(73) Assignee: TOTAL MARKETING SERVICES, Puteaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/259,285

(22) PCT Filed: Jul. 10, 2019

(86) PCT No.: PCT/EP2019/068617
§ 371 (c)(1),
(2) Date: Jan. 11, 2021

(87) PCT Pub. No.: WO2020/011889
PCT Pub. Date: Jan. 16, 2020

(65) Prior Publication Data
US 2021/0277322 A1 Sep. 9, 2021

(30) Foreign Application Priority Data
Jul. 13, 2018 (FR) ...................................... 1856470

(51) Int. Cl.
*C10M 131/04* (2006.01)
*C09K 5/10* (2006.01)
(Continued)

(52) U.S. Cl.
CPC ............ *C10M 131/04* (2013.01); *C09K 5/10* (2013.01); *C10M 131/08* (2013.01);
(Continued)

(58) Field of Classification Search
CPC .. C09K 5/10; C09K 2205/112; C10M 131/04; C10M 131/08; C10M 137/04;
(Continued)

(56) References Cited

U.S. PATENT DOCUMENTS

| 5,839,311 A | 11/1998 | Grenfell et al. |
| 5,851,436 A | 12/1998 | Merchant et al. |

(Continued)

FOREIGN PATENT DOCUMENTS

| CN | 101166804 A | 4/2008 |
| CN | 102762685 A | 10/2012 |

(Continued)

OTHER PUBLICATIONS

Isopar, ExxonMobil, "Isopar (TM) Fluids for Personal Care Products", XP055560761, https://www.exxonmobilchemical.com/~/media/chemicals/kl-media-assets/2018/02/00/01/isopar_fluids_factsheets_enpdf.pdf [extrait le Feb. 22, 2019], Jan. 31, 2018, 2 pages.
(Continued)

*Primary Examiner* — James C Goloboy
(74) *Attorney, Agent, or Firm* — The Marbury Law Group, PLLC

(57) ABSTRACT

The present invention relates to a composition for lubricating a propulsion system of an electric or hybrid vehicle, comprising at least one base oil and at least one fire retardant corresponding to formula (I)

$$R_F\text{-}L\text{-}R_H \qquad (I)$$

in which $R_F$ is a perfluorinated or partially fluorinated group, $R_H$ is a hydrocarbon-based group, and L is a linker.

(Continued)

The invention also relates to the use of at least one fire retardant of formula (I), in a composition for lubricating a propulsion system of an electric or hybrid vehicle, including at least one battery, to give it ignition-resistance properties. Finally, the invention relates to a process for cooling and fire-protecting a battery of a propulsion system of an electric or hybrid vehicle, comprising at least one step of placing at least one battery, in particular a lithium-ion or nickel-cadmium battery, in contact with a composition according to the invention.

19 Claims, 1 Drawing Sheet

(51) Int. Cl.
| | | |
|---|---|---|
| *C10M 131/08* | (2006.01) | |
| *C10M 169/04* | (2006.01) | |
| *C10M 137/04* | (2006.01) | |
| *C10N 20/02* | (2006.01) | |
| *C10N 40/14* | (2006.01) | |
| *C10N 40/16* | (2006.01) | |

(52) U.S. Cl.
CPC ........ *C10M 137/04* (2013.01); *C10M 169/04* (2013.01); *C09K 2205/112* (2013.01); *C10M 2205/0285* (2013.01); *C10M 2207/2805* (2013.01); *C10M 2209/1033* (2013.01); *C10M 2211/022* (2013.01); *C10M 2211/042* (2013.01); *C10M 2223/02* (2013.01); *C10M 2223/04* (2013.01); *C10N 2020/02* (2013.01); *C10N 2040/14* (2013.01); *C10N 2040/16* (2013.01)

(58) Field of Classification Search
CPC ........ C10M 169/04; C10M 2295/0285; C10M 2207/2805; C10M 2209/1033; C10M 2211/022; C10M 2211/042; C10M 2223/02; C10M 2223/04; C10N 2020/02; C10N 2040/14; C10N 2040/16
See application file for complete search history.

(56) References Cited

U.S. PATENT DOCUMENTS

| | | | |
|---|---|---|---|
| 6,417,153 B1 | 7/2002 | Owens | |
| 2002/0147117 A1* | 10/2002 | Kawata | C10M 135/36 508/258 |
| 2006/0237683 A1 | 10/2006 | Nappa et al. | |
| 2011/0275549 A1* | 11/2011 | Nonaka | C10M 129/76 508/502 |
| 2012/0157362 A1 | 6/2012 | Knapp et al. | |
| 2012/0164506 A1 | 6/2012 | Claeys et al. | |
| 2012/0283162 A1* | 11/2012 | Tsubouchi | C10M 105/18 508/505 |
| 2013/0012421 A1 | 1/2013 | Smith | |
| 2013/0193368 A1 | 8/2013 | Low | |
| 2015/0377533 A1* | 12/2015 | Harkins | F25B 31/002 62/77 |
| 2016/0248061 A1 | 8/2016 | Brambrink et al. | |
| 2016/0257886 A1 | 9/2016 | Gangi | |
| 2016/0376209 A1 | 12/2016 | Gregersen et al. | |
| 2018/0079990 A1 | 3/2018 | Aoyama | |
| 2018/0100115 A1* | 4/2018 | Gao | C10M 171/02 |
| 2018/0100117 A1 | 4/2018 | Flores-Torres et al. | |
| 2018/0100118 A1 | 4/2018 | Flores-Torres et al. | |
| 2018/0100120 A1 | 4/2018 | Flores-Torres et al. | |
| 2019/0024006 A1* | 1/2019 | Yoshida | C10M 147/04 |
| 2019/0264121 A1 | 8/2019 | China | |
| 2021/0292628 A1 | 9/2021 | Prentice et al. | |

FOREIGN PATENT DOCUMENTS

| | | |
|---|---|---|
| CN | 105969315 A | 9/2016 |
| CN | 108199113 A | 6/2018 |
| EP | 1 728 844 A1 | 6/2006 |
| EP | 2 084 245 A1 | 8/2009 |
| EP | 2 368 967 A1 | 9/2011 |
| EP | 3144059 A1 | 3/2017 |
| JP | 2012-184360 A | 9/2012 |
| WO | 97/21425 A1 | 6/1997 |
| WO | 97/47704 A1 | 12/1997 |
| WO | 02/08378 A1 | 1/2002 |
| WO | 2008/149325 A1 | 12/2008 |
| WO | 2011/011385 A1 | 9/2011 |
| WO | 2011/113851 A1 | 9/2011 |
| WO | 2014/033762 A1 | 9/2012 |
| WO | 2015/116496 A1 | 8/2015 |
| WO | 2016/185046 A1 | 11/2016 |
| WO | 2018/078024 A1 | 5/2018 |

OTHER PUBLICATIONS

Thompson Scientific, London, GB; vol. 2012, No. 67, AN 2012-M44304, Retrieved from: Database WPI, XP002789196, 2017 Clarivate Analytics.
Non-Final Office Action for copending U.S. Appl. No. 17/259,278, dated Sep. 16, 2021.
Non-Final Office Action for copending U.S. Appl. No. 17/259,280, dated Sep. 16, 2021.
Non-Final Office Action for copending U.S. Appl. No. 17/259,287, dated Oct. 26, 2021.
English language translation of International Search Report for International Application No. PCT/EP2019/068614 received from the European Patent Office dated Oct. 4, 2019.
Written Opinion for International Application No. PCT/EP2019/068614 received from the European Patent Office dated Jul. 10, 2019.
English language translation of International Search Report for International Application No. PCT/EP2019/068613 received from the European Patent Office dated Oct. 2, 2019.
Written Opinion for International Application No. PCT/EP2019/068613 received from the European Patent Office dated Jul. 10, 2019.
English language translation of International Search Report for International Application No. PCT/EP2019/068616 received from the European Patent Office dated Oct. 4, 2019.
Written Opinion for International Application No. PCT/EP2019/068616 received from the European Patent Office dated Jul. 10, 2019.
English language translation of International Search Report for International Application No. PCT/EP2019/068617 received from the European Patent Office dated Oct. 7, 2019.
Written Opinion for International Application No. PCT/EP2019/068617 received from the European Patent Office dated Jul. 10, 2019.
Non-Final Office Action for copending U.S. Appl. No. 17/259,278, dated Mar. 1, 2022.
Translation of Chinese Office Action for counterpart Application No. 201980056085.6, dated Nov. 3, 2021.
Translation of Chinese Office Action for Application No. 201980058806.7, dated Mar. 25, 2022.

* cited by examiner

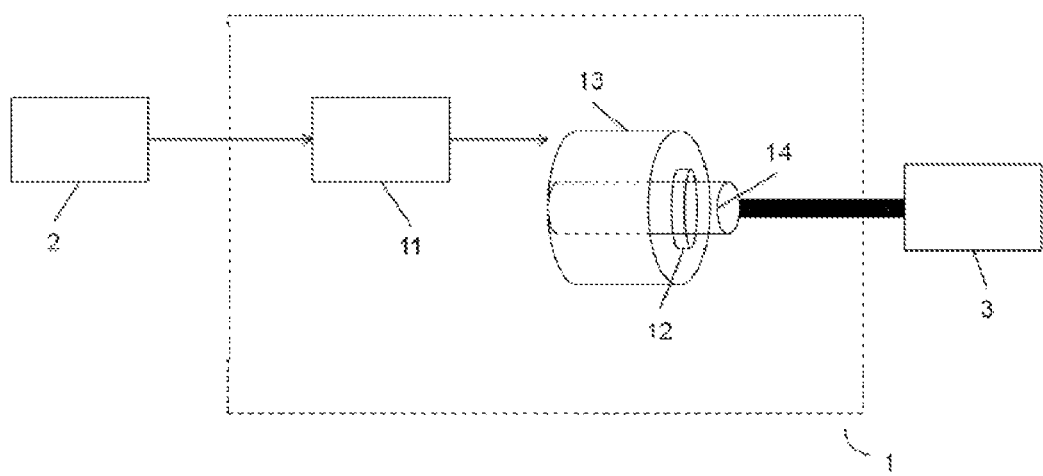

COOLING AND FLAME-RETARDANT LUBRICATING COMPOSITION FOR A PROPULSION SYSTEM OF AN ELECTRIC OR HYBRID VEHICLE

CROSS REFERENCE TO RELATED APPLICATIONS

This application in a National Phase Application claiming priority to International Application No. PCT/EP2019/068617 filed Jul. 10, 2019, which claims priority to French Application No. 1856470, filed Jul. 13, 2018, both of which are incorporated by reference herein in their entirety.

The present invention relates to the field of lubricant compositions for a propulsion system of an electric or hybrid vehicle. The invention is thus directed toward proposing a composition which simultaneously has lubricant properties with respect to the transmission of the propulsion system, cooling properties on the power electronics and the battery, and the two properties combined with respect to the motor in a propulsion system of an electric or hybrid vehicle. The composition also has ignition-resistance properties, which displays its utility with respect to batteries. In other words, the present invention is directed in particular toward proposing a means for cooling the batteries of electric or hybrid vehicles via a fluid which can cool but also retard or prevent fire propagation.

The changes in the international standards for the reduction of $CO_2$ emissions, but also for the reduction of energy consumption, has driven motor vehicle constructors toward proposing alternative solutions to combustion engines.

One of the solutions identified by motor vehicle constructors consists in replacing combustion engines with electric motors. The research aimed at reducing $CO_2$ emissions has thus led to the development of electric vehicles by a certain number of motor vehicle companies.

For the purposes of the present invention, the term "electric vehicle" means a vehicle comprising an electric motor as sole means of propulsion, as opposed to a hybrid vehicle which comprises a combustion engine and an electric motor as combined means of propulsion.

For the purposes of the present invention, the term "propulsion system" means a system comprising the mechanical parts required for propelling an electric vehicle. The propulsion system thus more particularly encompasses an electric motor comprising the rotor-stator assembly, power electronics (dedicated to regulating the speed), a transmission and a battery.

In general, it is necessary to use, in electric or hybrid vehicles, compositions to meet the constraints of lubricating and/or cooling the various parts of the propulsion system recalled above.

As regards the electric motor itself, the lubricant composition acts both as lubricant and as coolant. As regards the power electronics, the composition allows cooling. The transmission is lubricated with the composition and, finally, the batteries are cooled with said composition.

The lubricant composition according to the invention ensures the safety of the batteries, while at the same time cooling the battery.

The composition according to the invention thus plays the multiple role of cooling, lubrication and resistance to ignition.

Lubricant compositions, also referred to as "lubricants", are commonly used in propulsion systems such as electric motors for the purposes of reducing the friction forces between the various metal parts in motion in the motors. They are also effective for preventing premature wear or even damage of these parts, and in particular of their surface.

To do this, a lubricant composition is conventionally composed of one or more base oils which are generally combined with several additives intended for stimulating the lubricant performance of the base oils, for instance friction-modifying additives.

Moreover, electric propulsion systems generate heat during their functioning via the electric motor, the power electronics and the batteries. Since the amount of heat generated is greater than the amount of heat normally dissipated to the environment, it is necessary to ensure cooling of the motor, the power electronics and the batteries. In general, the cooling takes place on several parts of the propulsion system which generate heat and/or the heat-sensitive parts of said system, so as to prevent dangerous temperatures from being reached, and notably the power electronics and the batteries.

Conventionally, it is known practice to cool electric motors with air or water, optionally combined with glycol. These cooling methods are not optimal, or even are insufficient with regard to the new evolutions of electric and hybrid vehicle propulsion systems.

Fire retardants that can be used in fluids, including oily fluids, notably for industrial applications, are moreover known.

However, certain virtually nonflammable oils are generally composed of heavy halogenated compounds such as polychlorotrifluoroethylenes (PCTFE). Moreover, certain perfluorinated organic fluids of ether or ketone type are also known as coolant fluids for the propulsion system of electric vehicles.

These halogenated compounds are very expensive and their use is not favored for regulatory and environmental reasons. Furthermore, these halogenated compounds have a high density which adds to the mass of the battery, the final consequence of which would be to reduce the autonomy of the vehicle.

Despite the cooling systems known in the field of lubrication of the propulsion systems of electric or hybrid vehicles, the risk of overheating in a cell of the battery cannot be entirely eliminated, and may lead to an explosion and to the whole battery igniting, which is known as the "runaway effect". This is in particular what may be feared in the functioning of an Li-ion or Ni—Cd battery which are particularly targeted in the context of the present invention.

The present invention is directed precisely toward proposing a novel composition for simultaneously satisfying the lubrication and the cooling of the abovementioned elements of the propulsion system, on the one hand, and also, on the other hand, for ensuring the safety of batteries, in particular lithium-ion (Li-ion) or nickel-cadmium (Ni—Cd) batteries, by imparting ignition-resistance properties.

More precisely, the inventors have discovered that it is possible to ensure the multiple function of lubrication, cooling and also resistance to ignition for a propulsion system of an electric or hybrid vehicle, by using at least one fire retardant, and more particularly a fluoro fire retardant of formula (I) as defined below, in a base oil.

The composition thus formed may be placed in direct contact with the propulsion system and cool the motor, the power electronics and the battery by means of this direct contact of said composition with these members, while at the same time ensuring increased safety in the event of runaway of said battery.

The composition thus in direct contact with these members provides better cooling than conventional air cooling and water cooling with indirect contact. This direct contact allows better heat dissipation.

The reason for this is that air cooling allows direct cooling, but air is a very poor heat-dissipating fluid. Conversely, water is an efficient coolant fluid but is incompatible with direct contact with the motor, the power electronics and the battery.

Thus, according to a first of its aspects, the present invention relates to a composition for lubricating a propulsion system of an electric or hybrid vehicle, comprising at least one base oil and at least one fire retardant corresponding to formula (I)

$$R_F\text{-}L\text{-}R_H \quad (I)$$

in which $R_F$ is a perfluorinated or partially fluorinated group, in particular including from 1 to 22, preferably from 1 to 20 and even more preferentially from 1 to 16 carbon atoms, $R_H$ is a hydrocarbon-based group, in particular including from 1 to 22, preferably from 1 to 20 and even more preferentially from 1 to 16 carbon atoms, and L is a linker.

The present invention also relates to the use of at least one fire retardant corresponding to formula (I)

$$R_F\text{-}L\text{-}R_H \quad (I)$$

in which $R_F$ is a perfluorinated or partially fluorinated group, in particular including from 1 to 22, preferably from 1 to 20 and even more preferentially from 1 to 16 carbon atoms, $R_H$ is a hydrocarbon-based group, in particular including from 1 to 22, preferably from 1 to 20 and even more preferentially from 1 to 16 carbon atoms, and L is a linker, in a composition for lubricating a propulsion system of an electric or hybrid vehicle, including at least one battery, to give it ignition-resistance properties.

More particularly, the lubricant composition thus supplemented is intended to be placed in direct contact with the batteries of electric vehicles, notably Li-ion batteries or an Ni—Cd battery, which are notably in immersion or semi-immersion, static or in circulation, in said supplemented lubricant composition, or composition according to the invention, or else directly sprayed in the form of an oil spray, jet or mist.

Fluoro compounds, notably in the form of diblock fluoro compounds, are described in document WO 97/21425. However, these fluoro compounds are described as dispersants for controlling the bioavailability and the efficiency of lipophilic compounds, in emulsions. No application in accordance with the present invention is described or suggested therein.

A composition according to the invention makes it possible to efficiently cool the battery, the power electronics and the motor present in an electric or hybrid vehicle.

Also, a composition according to the invention makes it possible to retard or prevent thermal runaway, or even fire propagation in the event of ignition of one of the cells of the battery.

A composition according to the invention can also provide lubrication of the propulsion system of an electric or hybrid vehicle, and more particularly the electric motor itself and the transmission.

Advantageously, a composition according to the invention can provide lubrication of the transmission, in particular the reducer, of an electric or hybrid vehicle.

Thus, this unique composition according to the invention makes it possible simultaneously to ensure the cooling of the motor, of the power electronics and of the battery and its protection against fire, by retarding and/or preventing fire propagation, in particular in the event of explosion and/or ignition of the battery, notably of an Li-ion or Ni—Cd battery, and also lubrication of the electric motor, of the transmission, in particular the reducer, in an electric or hybrid vehicle.

The invention also relates to a process for cooling and fire-protecting a battery of a propulsion system of an electric or hybrid vehicle, comprising at least one step of placing at least one battery, in particular a lithium-ion or nickel-cadmium battery, in contact with a composition according to the invention.

Other features, variants and advantages of the use of a composition according to the invention will emerge more clearly on reading the description and the FIGURE that follow, which are given as nonlimiting illustrations of the invention.

In the context of the present invention, the terms "flame retardant", capable of "providing fire protection", "fire retardant", "retarding and/or preventing fire propagation" or "ignition-resistant" may be used interchangeably. All these terms qualify the compounds which have the capacity of rendering an object safe in the event of an explosion or an ignition, in particular following overheating.

In the continuation of the text, the expressions "between . . . and . . . ", "ranging from . . . to . . . " and "varying from . . . to . . . " are equivalent and are intended to mean that the limits are included, unless otherwise mentioned.

The expression "including a" should be understood as being synonymous with "including at least one", unless otherwise specified.

FIG. 1 is a schematic representation of an electric or hybrid propulsion system.

COMPOSITION

As indicated previously, a composition according to the invention comprises at least one base oil or fluid base as explained below, and a fire retardant corresponding to formula (I), defined in detail below.

More particularly, a composition according to the invention has a kinematic viscosity, measured at 100° C. according to the standard ASTM D445, of between 2 and 8 mm²/s, preferably between 3 and 7 mm²/s.

Base Oil

A composition according to the invention uses at least one base oil, in particular a fluid base formed from at least one base oil having a kinematic viscosity, measured at 100° C. according to the standard ASTM D445, ranging from 1.5 to 8 mm²/s, in particular from 1.5 to 6.1 mm²/s, more particularly from 1.5 to 4.1 mm²/s and even more particularly from 1.5 to 2.1 mm²/s.

This base oil may be a mixture of several base oils, namely a mixture of two, three or four base oils.

In the continuation of the text, the term "fluid base" will denote the base oil or mixture of base oils, having a kinematic viscosity measured at 100° C. according to the standard ASTM D445 ranging from 1.5 to 8 mm²/s.

The base oil used in a lubricant composition according to the invention may be chosen from oils of mineral or synthetic origin belonging to groups I to V according to the classes defined by the API classification (or equivalents thereof according to the ATIEL classification) and presented in table A below or mixtures thereof, provided that the oil or the mixture of oils has the abovementioned desired viscosity.

TABLE A

| | Content of saturates | Sulfur content | Viscosity index (VI) |
|---|---|---|---|
| Group I Mineral oils | <90 % | >0.03% | 80 ≤ VI < 120 |
| Group II Hydrocracked oils | ≥90% | ≤0.03% | 80 ≤ VI < 120 |
| Group III Hydrocracked or hydroisomerized oils | ≥90% | ≤0.03% | ≥120 |
| Group IV | Poly-α-olefins (PAO) | | |
| Group V | Esters and other bases not included in groups I to IV | | |

The mineral base oils include all types of base oils obtained by atmospheric and vacuum distillation of crude oil, followed by refining operations such as solvent extraction, deasphalting, solvent deparaffinning, hydrotreating, hydrocracking, hydroisomerization and hydrofinishing.

Mixtures of synthetic and mineral oils, which may be biobased, may also be used.

There is generally no limit as regards the use of different base oils for preparing the compositions according to the invention, apart from the fact that they must, besides meeting the abovementioned viscosity criterion, have properties, notably in terms of viscosity index, sulfur content or resistance to oxidation, that are suitable for use for the propulsion systems of an electric or hybrid vehicle.

According to one embodiment, the base oil(s) of a composition according to the invention are hydrocarbon-based oils, preferably alkanes.

Still according to this embodiment, the base oil(s) may be chosen from alkanes comprising at least 8 carbon atoms, for example between 8 and 22 carbon atoms, preferably between 15 and 22 carbon atoms. For example, they may be $C_8$-$C_{22}$ and preferably $C_{15}$-$C_{22}$ alkanes.

The base oils of the compositions according to the invention may also be chosen from synthetic oils, such as certain esters of carboxylic acids and of alcohols, from poly-α-olefins (PAO) and from polyalkylene glycols (PAG) obtained by polymerization or copolymerization of alkylene oxides comprising from 2 to 8 carbon atoms, in particular from 2 to 4 carbon atoms.

The PAOs used as base oils are obtained, for example, from monomers comprising from 4 to 32 carbon atoms, for example from octene or decene.

The weight-average molecular mass of the PAO may vary quite broadly. Preferably, the weight-average molecular mass of the PAO is less than 600 Da. The weight-average molecular mass of the PAO may also range from 100 to 600 Da, from 150 to 600 Da or from 200 to 600 Da.

For example, the PAOs used in the context of the invention, having a kinematic viscosity, measured at 100° C. according to the standard ASTM D445, ranging from 1.5 to 8 mm²/s are sold commercially by Ineos under the brand names Durasyn® 162, Durasyn® 164, Durasyn® 166 and Durasyn® 168.

The esters of carboxylic acids and of alcohols are, for example, diesters of formula (II):

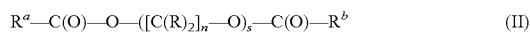

$$R^a-C(O)-O-([C(R)_2]_n-O)_s-C(O)-R^b \qquad (II)$$

in which:
R represent, independently of each other, a hydrogen atom or a linear or branched ($C_1$-$C_5$)alkyl group, in particular a methyl, ethyl or propyl group, notably methyl;

s is 1, 2, 3, 4, 5 or 6;

n is 1, 2 or 3; it being understood that when s is other than 1, n may be identical or different; and $R^a$ and $R^b$, which may be identical or different, represent, independently of each other, saturated or unsaturated, linear or branched hydrocarbon-based groups, bearing a linear chain of 6 to 18 carbon atoms.

Preferably, when s and n are identical and equal to 2, at least one of the groups R represents a linear or branched ($C_1$-$C_5$)alkyl group; and when s is 1 and n is 3, at least one of the groups R bonded to the carbon in the beta position relative to the oxygen atoms of the ester functions represents a hydrogen atom.

Advantageously, the base oil(s) of the composition according to the invention are chosen from poly-α-olefins (PAOs).

Preferably, a composition according to the invention comprises a fluid base formed from one or more base oils with a kinematic viscosity measured at 100° C. according to the standard ASTM D445 of between 1.5 and 8 mm²/s.

In other words, a composition according to the invention may be free of base oil or mixture of base oils not meeting the kinematic viscosity criterion measured at 100° C. according to the standard ASTM D445, in particular free of base oil or mixture of base oils having a viscosity of greater than 9 mm²/s.

In particular, the base oil may be chosen from alkanes comprising at least 8 carbon atoms, for example between 8 and 22 carbon atoms, preferably between 15 and 22 carbon atoms or from synthetic oils of the type such as esters of carboxylic acids and of alcohols, poly-α-olefins (PAOs) or polyalkylene glycols (PAGs) obtained by polymerization or copolymerization of alkylene oxides comprising from 2 to 8 carbon atoms, in particular from 2 to 4 carbon atoms.

It falls to a person skilled in the art to adjust the content of fluid base to be used in a composition according to the invention to achieve the desired viscosity for the composition.

As indicated previously, the fluid base affords the lubricant and cooling potential of the composition according to the invention. In particular, the fluidity of the base notably affords good cooling properties during the use of the composition in contact with the batteries of a propulsion system of an electric or hybrid vehicle.

The cooling properties of the composition used are more advantageously increased by the shear applied to the composition on injection, which brings the fluid to a viscosity level lower than at rest.

In particular, a composition according to the invention comprises from 60% to 99.5% by weight, preferably from 70% to 98% by weight, for example from 80% to 99.5% by weight, even more preferentially from 80% to 98% by weight, advantageously from 90% to 97% by weight of base oil, or of mixture of base oils, with a kinematic viscosity measured at 100° C. according to the standard ASTM D445 ranging from 1.5 to 8 mm²/s, relative to the total weight of the composition.

Fire Retardant

In the context of the present invention, at least one fire retardant is incorporated into the lubricant composition of a propulsion system of an electric or hybrid vehicle, corresponding to formula (I)

$$R_F\text{-}L\text{-}R_H \qquad (I)$$

in which $R_F$ is a perfluorinated or partially fluorinated group,
$R_H$ is a hydrocarbon-based group, and
L is a linker.

In the context of the present invention, the term "partially fluorinated group" means that at least 60% of the hydrogen atoms in the group concerned have been replaced with fluorine atoms, for example between 60% and 80%.

Without the Applicant being bound by any theory, it is described that the presence of at least one fire retardant of formula (I) is suitable for forming micelles in the lubricant composition. In the event of heating liable to be caused by a fire, the micelles will be present at the surface of the composition, making it possible to combat the fire.

According to a particular embodiment, the group $R_F$ includes between 1 and 22, preferably between 1 and 20 and more particularly between 1 and 16 carbon atoms. Said group may optionally be interrupted with 1 to 4 heteroatoms chosen from a nitrogen atom and an oxygen atom. This group may moreover be linear or branched.

Advantageously, it is a perfluorinated or partially fluorinated $(C_1\text{-}C_{16})$alkyl group, optionally interrupted with one or two heteroatoms chosen from a nitrogen atom and an oxygen atom.

Such a group $R_F$ may be chosen, for example, from the following groups:

$CF_3(CF_2)_m$—,
$C(CF_3)_3(CF_2)_m$—,
$(CF_3)_2CF(CF_2)_m$—,
$(CF_3)_2CF$—, and
$(CF_3)CF_2$—,
$(CF_3)(CF_2)_3$—, with m being an integer which may be between 1 and 15, m being an integer between 0 and 14.

These examples are not limiting.

According to another particular embodiment, the group $R_H$ includes between 1 and 22 carbon atoms, preferably between 1 and 20, even more preferentially between 1 and 16, carbon atoms. According to a particular embodiment, this group $R_H$ may comprise between 1 and 4 heteroatoms chosen from a nitrogen atom and an oxygen atom. This group may moreover be linear or branched. It may moreover be saturated or may comprise from 1 to 4 unsaturations.

According to another embodiment, the group $R_H$ may preferably include between 3 and 22 carbon atoms, more preferentially between 3 and 18, for example between 5 and 15, or even between 10 and 15 carbon atoms.

Advantageously it is a $(C_1\text{-}C_{15})$alkyl, notably $(C_3\text{-}C_{15})$alkyl or $(C_2\text{-}C_{15})$alkenyl group, said group being optionally substituted with a hydrocarbon-based ring such as the $(C_3\text{-}C_6)$cycloalkyl, phenyl or benzyl group.

Such a group $R_H$ may notably be chosen from the following groups, without, however, being limited thereto:

—$(CH_2)_nCH_3$,
—$(CH_2)_nC_6H_4$,
—$(CH_2)_qO(CH_2)_rCH_3$, and
—$(CH_2)_sC$═$C(CH_2)_tCH_3$ with n being an integer which may be between 1 and 21, for example between 2 and 21, in particular between 7 and 21, p being between 1 and 16, in particular between 2 and 10, q and r being independently between 1 and 16, with q+r being less than or equal to 21 and advantageously greater than 7, s and t being independently between 1 and 16, with s+t being less than or equal to 19 and advantageously greater than 5.

The linker L may notably be chosen from the following divalent groups: —$CH_2$—, —$CH$═$CH$—, —O—, —S— or —$PO_4$—.

According to a particular embodiment, the fire retardant may be chosen from the compounds of formula (I) in which $R_F$ is a perfluorinated or partially fluorinated $(C_2\text{-}C_{12})$alkyl group, $R_H$ is a $(C_1\text{-}C_{12})$alkyl, notably $(C_3\text{-}C_{12})$alkyl, in particular $(C_6\text{-}C_{12})$alkyl or $(C_2\text{-}C_{12})$alkenyl, in particular $(C_6\text{-}C_{12})$alkenyl group, said group being optionally substituted with a hydrocarbon-based ring such as the $(C_3\text{-}C_6)$ cycloalkyl, phenyl or benzyl group, and said group possibly being interrupted with one or two heteroatoms chosen from nitrogen and oxygen, and L is a linker chosen from —$CH_2$—, —$CH$═$CH$— and —O—.

It is understood in the context of the present invention that the fire retardant of formula (I) as defined previously may be in the form of a mixture of fire retardants of formula (I) as defined previously.

In the context of the present invention, the following terms are defined as follows:

"$(C_1\text{-}C_x)$alkyl" refers to a linear or branched, saturated hydrocarbon-based chain including from 1 to x carbon atoms, for example a $(C_1\text{-}C_{12})$alkyl group. Nonlimiting examples that may be mentioned include the following groups: methyl, ethyl, 1-propyl, 2-propyl, butyl, pentyl, hexyl, heptyl and decyl;

"$(C_2\text{-}C_x)$alkenyl" refers to a linear or branched, unsaturated hydrocarbon-based chain including from 2 to x carbon atoms, for example a $(C_2\text{-}C_{12})$alkyl group. Nonlimiting examples that may be mentioned include the following groups: ethylene, propylene, butylene, pentylene, hexylene and decylene;

"$(C_3\text{-}C_6)$cycloalkyl" refers to a saturated cyclic hydrocarbon-based chain. Nonlimiting examples that may be mentioned include the following groups: cyclopropyl, cyclobutyl, cyclopentyl and cyclohexyl.

According to the present invention, the fire retardant(s) of formula (I) may be present in a content of between 0.5% and 40% by weight, relative to the total weight of the composition in accordance with the present invention, in particular in a content of between 2% and 30% by weight, even more particularly in a content of between 2% and 20% by weight, advantageously between 3% and 10% by weight.

In terms of formulation of the composition according to the present invention, any method known to those skilled in the art may be used for this supplementation of the oil with at least one fire retardant.

Additives

The lubricant composition in accordance with the invention may also comprise at least one free-radical inhibitor.

Such free-radical inhibitors are known per se to those skilled in the art and may be of various chemical nature and may in particular belong to various chemical families.

In terms of formulation of the composition according to the present invention, any method known to those skilled in the art may be used for this supplementation of the oil.

Among the free-radical inhibitors, mention may notably be made of phosphorus-based free-radical inhibitors.

Among the phosphorus-based free-radical inhibitors that are distinguished are compounds for which the phosphorus is a P(V) or pentavalent phosphorus and compounds for which the phosphorus is a P(III) or trivalent phosphorus.

Among these compounds in the form of a pentavalent phosphorus, P(V), mention may notably be made of the phosphate family and in particular triethyl phosphate, trimethyl phosphate, optionally fluorinated alkyl phosphates, or aryl phosphates.

A fluorinated alkyl phosphate that may notably be mentioned is tris(2,2,2-trifluoroethyl) phosphate.

Aryl phosphates that may notably be mentioned include triphenyl phosphate, tricresyl phosphate and trixylenyl phosphate.

Still among these compounds in the form P(V), mention may notably be made of the phosphazene family. In this family, which is characterized in that the representatives thereof include at least one double bond between a pentavalent phosphorus atom and a nitrogen atom, cyclic compounds are favored. Mention may notably be mentioned of hexamethoxy cyclotriphosphazene.

Among these compounds in the form of a trivalent phosphorus, P(III), mention may notably be made of the phosphite family. In this family, mention may notably be made of tris(2,2,2-trifluoroethyl) phosphite.

The lubricant composition in accordance with the invention may also comprise at least one additional fire retardant, other than the fire retardant of formula (I) defined above.

Among these other fire retardants, mention may notably be made of halogenated compounds other than fluoro compounds.

It falls to a person skilled in the art to adjust the proportions of the various constituents of the composition, notably of the fluid base, of the fire retardant of formula (I) as defined previously and optionally of the free-radical inhibitor and/or of the additional fire retardants, to comply with the viscosity required according to the invention, and optionally the density of the composition.

Alternatively, a composition according to the invention may also comprise one or more additives as defined more precisely in the text hereinbelow.

Other Additives

According to one variant of the invention, the lubricant composition according to the present invention also comprises additives which modify the properties of the base oil.

The additives that may be incorporated into a composition according to the invention may be chosen from friction modifiers, detergents, anti-wear additives, extreme-pressure additives, dispersants, antioxidants, pour-point improvers, antifoams and mixtures thereof.

It is understood that the nature and amount of additives used are chosen so as not to affect the combined properties of cooling power of the composition according to the invention and fire protection.

These additives may be introduced individually and/or in the form of a mixture like those that are already available for sale for commercial lubricant formulations for vehicle engines, with a level of performance as defined by the ACEA (Association des Constructeurs Européens d'Automobiles) and/or the API (American Petroleum Institute), which are well known to those skilled in the art.

The anti-wear additives and the extreme-pressure additives protect the friction surfaces by forming a protective film which is adsorbed onto these surfaces.

A wide variety of anti-wear additives exists. Preferably, for the composition according to the invention, the anti-wear additives are chosen from phospho-sulfur-based additives such as metal alkylthiophosphates, in particular zinc alkylthiophosphates, and more specifically zinc dialkyldithiophosphates or ZnDTP. The preferred compounds have the formula $Zn((SP(S)(OR^2)(OR^3))_2$, in which $R^2$ and $R^3$, which may be identical or different, independently represent an alkyl group, preferentially an alkyl group including from 1 to 18 carbon atoms.

Amine phosphates are also anti-wear additives that may be used in a composition according to the invention. However, the phosphorus provided by these additives may act as a poison for the catalytic systems of motor vehicles since these additives generate ash. These effects can be minimized by partially replacing the amine phosphates with additives not providing any phosphorus, for instance polysulfides, notably sulfur-based olefins.

A lubricant composition according to the invention may comprise from 0.01% to 6% by weight, preferentially from 0.05% to 4% by weight and more preferentially from 0.1% to 2% of anti-wear additives and of extreme-pressure additives, by mass relative to the total weight of the composition.

According to a particular embodiment, a lubricant composition according to the invention is free of anti-wear additives and of extreme-pressure additives. In particular, a lubricant composition according to the invention is advantageously free of phosphate-based additives.

A lubricant composition according to the invention may comprise at least one friction-modifying additive. The friction-modifying additive may be chosen from a compound providing metal elements and an ash-free compound. Among the compounds providing metal elements, mention may be made of complexes of transition metals such as Mo, Sb, Sn, Fe, Cu or Zn, the ligands of which may be hydrocarbon-based compounds comprising oxygen, nitrogen, sulfur or phosphorus atoms. The ash-free friction-modifying additives are generally of organic origin and may be chosen from fatty acid monoesters of polyols, alkoxylated amines, alkoxylated fatty amines, fatty epoxides, fatty epoxide borates; fatty amines or glycerol esters of fatty acid. According to the invention, the fatty compounds comprise at least one hydrocarbon-based group comprising from 10 to 24 carbon atoms.

A lubricant composition according to the invention may comprise from 0.01% to 2% by weight or from 0.01% to 5% by weight, preferentially from 0.1% to 1.5% by weight or from 0.1% to 2% by weight of friction-modifying additive, relative to the total weight of the composition.

Advantageously, a lubricant composition according to the invention is free of friction-modifying additive.

A lubricant composition according to the invention may comprise at least one antioxidant additive.

The antioxidant additive generally makes it possible to retard the degradation of the composition in service. This degradation may notably be reflected by the formation of deposits, the presence of sludges, or an increase in the viscosity of the composition.

The antioxidant additives notably act as free-radical inhibitors or hydroperoxide destroyers. Among the commonly used antioxidant additives, mention may be made of antioxidant additives of phenolic type, antioxidant additives of amine type and phospho-sulfur-based antioxidant additives. Some of these antioxidant additives, for example the phospho-sulfur-based antioxidant additives, may be ash generators. The phenolic antioxidants additives may be ash-free or may be in the form of neutral or basic metal salts. The antioxidants additives may notably be chosen from sterically hindered phenols, sterically hindered phenol esters and sterically hindered phenols comprising a thioether bridge, diphenylamines, diphenylamines substituted with at least one $C_1$-$C_{12}$ alkyl group, N,N'-dialkyl-aryl-diamines, and mixtures thereof.

Preferably according to the invention, the sterically hindered phenols are chosen from compounds comprising a phenol group, in which at least one carbon vicinal to the carbon bearing the alcohol function is substituted with at least one $C_1$-$C_{10}$ alkyl group, preferably a $C_1$-$C_6$ alkyl group, preferably a $C_4$ alkyl group, preferably with a tert-butyl group.

Amine compounds are another class of antioxidant additives that may be used, optionally in combination with the phenolic antioxidants additives. Examples of amine compounds are aromatic amines, for example the aromatic amines of formula $NR^4R^5R^6$ in which $R^4$ represents an optionally substituted aliphatic or aromatic group, $R^5$ represents an optionally substituted aromatic group, $R^6$ represents a hydrogen atom, an alkyl group, an aryl group or a group of formula $R^7S(O)_zR^8$ in which $R^7$ represents an alkylene group or an alkenylene group, $R^8$ represents an alkyl group, an alkenyl group or an aryl group and z represents 0, 1 or 2.

Sulfurized alkylphenols or the alkali metal or alkaline-earth metal salts thereof may also be used as antioxidant additives.

Another class of antioxidant additives is that of copper compounds, for example copper thio- or dithio-phosphates, copper salts of carboxylic acids, and copper dithiocarbamates, sulfonates, phenates and acetylacetonates. Copper I and II salts and succinic acid or anhydride salts may also be used.

A lubricant composition according to the invention may contain any type of antioxidant additive known to those skilled in the art.

Advantageously, a lubricant composition according to the invention comprises at least one ash-free antioxidant additive.

A lubricant composition according to the invention may comprise from 0.5% to 2% by weight of at least one antioxidant additive, relative to the total weight of the composition.

A lubricant composition according to the invention may also comprise at least one detergent additive.

The detergent additives generally make it possible to reduce the formation of deposits on the surface of metal parts by dissolving the oxidation and combustion byproducts.

The detergent additives that may be used in a lubricant composition according to the invention are generally known to those skilled in the art. The detergent additives may be anionic compounds comprising a long lipophilic hydrocarbon-based chain and a hydrophilic head. The associated cation may be a metal cation of an alkali metal or an alkaline-earth metal.

The detergent additives are preferentially chosen from alkali metal or alkaline-earth metal salts of carboxylic acids, sulfonates, salicylates and naphthenates, and also phenate salts. The alkali metals and alkaline-earth metals are preferentially calcium, magnesium, sodium or barium.

These metal salts generally comprise the metal in a stoichiometric amount or in excess, thus in an amount greater than the stoichiometric amount. They are then overbased detergent additives; the excess metal giving the overbased nature to the detergent additive is then generally in the form of a metal salt that is insoluble in the oil, for example a carbonate, a hydroxide, an oxalate, an acetate or a glutamate, preferentially a carbonate.

A lubricant composition according to the invention may comprise, for example, from 2% to 4% by weight of detergent additive, relative to the total weight of the composition.

A lubricant composition according to the invention may also comprise at least one pour-point depressant additive.

By slowing down the formation of paraffin crystals, the pour-point depressant additives generally improve the cold-temperature behavior of the composition.

Examples of pour-point depressant additives that may be mentioned include polyalkyl methacrylates, polyacrylates, polyarylamides, polyalkylphenols, polyalkylnaphthalenes and polyalkylstyrenes.

Also, a lubricant composition according to the invention may comprise at least one dispersant.

The dispersant may be chosen from Mannich bases, succinimides and derivatives thereof.

A lubricant composition according to the invention may comprise, for example, from 0.2% to 10% by weight of dispersant relative to the total weight of the composition.

As mentioned above, water is not compatible with direct contact with a propulsion system of an electric or hybrid vehicle, such as the motor, the power electronics and the battery.

Thus, a composition according to the invention is preferably free of water. For the purposes of the present invention, the term "free of water" means that the composition comprises less than 1% by weight of water, preferably less than 0.1% by weight, or does not comprise any water.

According to a particular embodiment, a composition according to the invention comprises, or even consists of:

from 80% to 99.5% by weight, preferably between 80% and 98% by weight, and more preferentially from 90% to 97% by weight, of one or more base oils;

from 0.5% to 40% by weight, preferably from 2% to 30% by weight, and more preferentially from 2% to 20% by weight, of one or more fire retardants corresponding to formula (I), in particular in which $R_F$ is a perfluorinated or partially fluorinated ($C_2$-$C_{12}$)alkyl group, $R_H$ is a ($C_6$-$C_{12}$)alkyl or ($C_6$-$C_{12}$)alkenyl group, said group being optionally substituted with a ($C_3$-$C_6$)cycloalkyl, phenyl or benzyl group, and said group possibly being interrupted with 1 or 2 heteroatoms chosen from nitrogen and oxygen, and L is a linker chosen from —$CH_2$—, —CH=CH— and —O—; and optionally from 0.1% to 10% by weight of one or more additives chosen from phosphorus-based free-radical inhibitors, friction modifiers, detergents, anti-wear additives, extreme-pressure additives, dispersants, antioxidants, pour-point improvers, antifoams and mixtures thereof;

the contents being expressed relative to the total weight of the composition.

APPLICATION

As indicated previously, a composition according to the invention may be used, by virtue of its combined properties in terms of lubricating, cooling and fire retarding, simultaneously as a fluid for lubricating the motor and the transmission, a coolant fluid for a propulsion system of an electric or hybrid vehicle, and more particularly for the motor, for the power electronics and the batteries, and as a fluid for retarding and/or preventing fire propagation for the batteries.

Advantageously, the composition according to the invention is placed in contact with the battery, by immersion or semi-immersion. In reality, the lubricant composition acts both as a coolant and as a fire protection agent with respect to the battery.

Alternatively, the lubricant composition according to the invention is advantageously placed in direct contact with the batteries via methods described below.

As batteries that are suitable for the propulsion systems of an electric or hybrid vehicle, mention is made of Li-ion batteries or nickel-cadmium batteries.

In particular, the invention relates to the use of a composition as defined previously for lubricating, cooling and rendering safe a propulsion system of an electric or hybrid vehicle.

An electric motor is typically powered by an electric battery (2). Lithium-ion batteries are the batteries most commonly encountered in the field of electric vehicles. The development of batteries that are increasingly powerful and of increasingly reduced size gives rise to the problem of cooling of this battery. Specifically, once the battery exceeds temperatures of the order of 50 to 60° C., there is a high risk of ignition or even of explosion of the battery. There is also a need to keep the battery at a temperature above about 0° C. so as to allow optimum functioning of the battery.

A composition of the invention may thus be used to cool the battery of an electric or hybrid vehicle and to retard and/or prevent fire propagation.

As represented schematically in FIG. 1, the propulsion system of an electric or hybrid vehicle notably comprises the electric motor part (1). Said part typically comprises power electronics (11) connected to a stator (13) and a rotor (14).

The stator comprises coils, in particular copper coils, which are powered by an alternating electric current. This makes it possible to generate a rotating magnetic field. For its part, the rotor comprises coils, permanent magnets or other magnetic materials, and is placed in rotation by the rotating magnetic field.

The power electronics (11), the stator (13) and the rotor (14) of a propulsion system (1) are parts of complex structure which generate a large quantity of heat during the running of the motor. It is thus imperative to ensure cooling of the electric motor and of the power electronics.

In addition, the rolling bearing (12), generally incorporated between the stator (13) and the rotor (14), is subjected to high mechanical loads and problems arise with wear by fatigue. It is therefore necessary to lubricate the rolling bearing in order to increase its service life.

The composition according to the invention as described previously ensures, in an electric or hybrid vehicle, besides the cooling function and the fire-protection function for the battery, the function of lubrication and protection against wear for the members in contact and also the cooling of the motor and of the power electronics.

A propulsion system of an electric or hybrid vehicle also comprises a transmission, and in particular a speed reducer (3) which makes it possible to reduce the rotation speed at the outlet of the electric motor and to adapt the speed transmitted to the wheels, making it possible simultaneously to control the speed of the vehicle.

This reducer is subject to high friction stresses and thus needs to be appropriately lubricated in order to prevent it from being damaged too quickly.

Thus, a composition as described above makes it possible to lubricate the transmission, in particular the reducer, in an electric or hybrid vehicle.

Thus, the invention relates to the use of a composition as described previously for cooling the battery, the motor and the power electronics, for lubricating the motor and the transmission and for providing fire protection to a propulsion system of an electric or hybrid vehicle, and notably the battery.

In particular, such a composition makes it possible to cool the power electronics and/or the rotor and/or the stator of the electric motor. It can also ensure lubrication of the rolling bearings located between the rotor and the stator of an electric motor of an electric or hybrid vehicle.

Thus, the invention has the advantage of allowing the use of a single composition combining coolant and flame-retardant or fire-retardant properties, as a fluid for cooling and fire-protecting a battery in an electric or hybrid vehicle, while at the same time providing a lubricant and cooling function for the propulsion system of an electric or hybrid vehicle as a whole.

The invention also relates to a process for cooling and fire-protecting a battery of a propulsion system of an electric or hybrid vehicle, comprising at least one step of placing at least one battery, in particular a lithium-ion or nickel-cadmium battery, in contact with a composition as defined above.

According to a particular embodiment, the step of placing in contact consists of immersion or semi-immersion of the battery in said composition or else of injection of said composition at the surface of the battery.

All of the features and preferences described for the lubricant composition according to the invention and for the uses thereof also apply to this process.

Cooling with a lubricant composition according to the invention may be performed via any method known to those skilled in the art.

The battery may be in immersion or semi-immersion, static or in circulation, in said composition.

As examples of placing in direct contact, mention may be made of cooling by injection, by jet, by spraying or by formation of a mist using the composition according to the invention under pressure and by gravity on the battery.

Advantageously the composition is injected by jet at relatively high pressure into the zones of the propulsion system to be cooled. Advantageously, the shear resulting from this injection makes it possible to reduce the viscosity of the fluid in the injection zone, relative to the kinematic viscosity at rest, and thus to further increase the cooling potential of the composition.

Furthermore, oil-circulating systems commonly used in electric motors may be employed, as described, for example, in document WO 2015/116496.

The invention claimed is:

1. A composition for lubricating a propulsion system of an electric or hybrid vehicle, comprising:
   at least one base oil; and
   at least one fire retardant represented by formula (I):

in which,
   $R_F$ is a perfluorinated or partially fluorinated group,
   $R_H$ is a hydrocarbon-based group, and
   L is a linker chosen from the following: —CH$_2$—, —CH=CH—, —O—, —S—, or —PO$_4$—,
   wherein the composition has a kinematic viscosity of between 2 and 8 mm²/s, measured at 100° C. according to the standard ASTM D445.

2. The composition as claimed in claim 1, wherein $R_H$ includes between 3 and 22 carbon atoms.

3. The composition as claimed in claim 1, wherein:
   $R_F$ is a perfluorinated or partially fluorinated ($C_1$-$C_{16}$) alkyl group, optionally interrupted with one or two heteroatoms independently chosen from a nitrogen atom and an oxygen atom; and $R_H$ is a $(C_1-C_{15})$alkyl group, or $(C_2-C_{15})$alkenyl group that is optionally substituted with a $(C_3-C_6)$cycloalkyl, phenyl, or benzyl group.

4. The composition as claimed in claim 1, wherein the composition comprises the fire retardant in an amount of between 0.5% and 40% by weight, relative to the total weight of the composition.

5. The composition as claimed in claim 1, wherein the base oil has a kinematic viscosity ranging from 1.5 to 8 mm²/s, measured at 100° C. according to the standard ASTM D445.

6. The composition as claimed in claim 1, wherein the base oil is chosen from synthetic oils, poly-α-olefins, or polyalkylene glycols obtained by polymerization or copolymerization of alkylene oxides comprising from 2 to 8 carbon atoms.

7. The composition as claimed in claim 1, wherein:
the composition comprises from 60% to 99.5% by weight of the base oil, relative to the total weight of the composition; and
the base oil has a kinematic viscosity ranging from 1.5 to 8 mm²/s, measured at 100° C. according to the standard ASTM D445.

8. The composition as claimed in claim 1, further comprising at least one additive chosen from friction modifiers, detergents, anti-wear additives, extreme-pressure additives, dispersants, antioxidants, pour-point improvers, antifoam agents, or mixtures thereof.

9. The composition as claimed in claim 1, further comprising at least one free-radical inhibitor and/or at least one additional fire retardant.

10. The composition as claimed in claim 9, wherein:
the free-radical inhibitor is chosen from compounds in the form of a pentavalent phosphorus of the phosphate or phosphazene family or in the form of a trivalent phosphorus of the phosphite family; and
the additional fire retardant is chosen from halogenated compounds other than fluoro compounds.

11. A method for giving ignition-resistance properties to a composition for lubricating a propulsion system of an electric or hybrid vehicle including at least one battery, comprising:

adding into the composition at least one fire retardant as claimed in claim 1; and
lubricating the propulsion system with the composition.

12. The method as claimed in claim 11, wherein the composition further comprises at least one free-radical inhibitor and/or at least one additional fire retardant.

13. The method as claimed in claim 11, wherein the composition comprises between 0.5% and 40% by weight of the fire retardant, relative to the total weight of the composition.

14. A process for cooling and/or fire-protecting a battery of a propulsion system of an electric or hybrid vehicle, comprising contacting the battery with a composition as claimed in claim 1.

15. The process as claimed in claim 14, wherein contacting the battery comprises:
completely or partially immersing the battery in a static or circulating amount of the composition; and/or
injecting, jetting, misting, and/or spraying the composition on the battery using pressure or gravity.

16. The composition as claimed in claim 1, wherein:
$R_F$ is a perfluorinated or partially fluorinated group including from 1 to 16 carbon atoms; and
$R_H$ is a hydrocarbon-based group including from 1 to 16 carbon atoms.

17. The composition as claimed in claim 1, wherein the composition comprises between 3% and 10% by weight of the fire retardant, relative to the total weight of the composition.

18. The composition as claimed in claim 1, wherein the base oil has a kinematic viscosity ranging from 1.5 to 2.1 mm²/s, measured at 100° C. according to the standard ASTM D445.

19. The composition as claimed in claim 1, wherein:
the composition comprises from 90% to 97% by weight of base oil, relative to the total weight of the composition; and
the base oil has a kinematic viscosity ranging from 1.5 to 8 mm²/s, measured at 100° C. according to the standard ASTM D445.

* * * * *